United States Patent
Valette et al.

(10) Patent No.: US 6,579,209 B1
(45) Date of Patent: Jun. 17, 2003

(54) SOFTWARE PRODUCT FOR PREVENTING AND TREATING REPETITIVE STRESS INJURIES

(76) Inventors: Brett Valette, 912 E. Karval Pl., Superior, CO (US) 80027; Lita Van Wagenen, 912 E. Karval Pl., Superior, CO (US) 80027

( * ) Notice: Subject to any disclaimer, the term of this patent is extended or adjusted under 35 U.S.C. 154(b) by 229 days.

(21) Appl. No.: 09/591,823

(22) Filed: Jun. 12, 2000

(51) Int. Cl.[7] .............................................. G01H 11/00
(52) U.S. Cl. .............................. 482/8; 482/1; 601/33; 400/704; 434/227
(58) Field of Search ........................... 482/1–4, 8, 900; 434/227, 229; 601/33; 400/704

(56) References Cited

U.S. PATENT DOCUMENTS

| | | | |
|---|---|---|---|
| 5,305,238 A | 4/1994 | Starr, III et al. | |
| 5,680,535 A | 10/1997 | Harbin et al. | |
| 5,792,025 A | 8/1998 | Kikinis | |
| 5,868,647 A | 2/1999 | Belsole | |
| 5,888,173 A | 3/1999 | Singhal | |
| 5,902,257 A | * 5/1999 | Korth | 601/23 |
| 6,142,910 A | * 11/2000 | Heuvelman | 482/4 |

OTHER PUBLICATIONS

MIT Information Systems, "Repetitive Strain Injuries (RSI)," http://web.mit.edu/is/pubs/is–13/rsi.html, Massachusetts Institute of Technology, p. 1–8 (Mar. 3, 1999).

Mary J. Ziegler, "Welcome to MIT's RSI Information Page," http://web.mit.edu/atic/ww/rsi/mitrsi/htm, Massachusetts Institute of Technology, p. 1–4 (Apr. 22, 1998).

Paul Marxhausen, "Computer Related–Repetitive Strain Injury," http://www.engr.unl.edu/eeshop/rsi.html, p. 1–18 (1996).

Author Unknown, "Protecting Your Child From Repetitive Stress Injuries," http://kidshealth.org/parent/safety/ergonomics.html, The Nemours Foundation, p. 1–5 (1999).

* cited by examiner

*Primary Examiner*—Glenn E. Richman
(74) *Attorney, Agent, or Firm*—Patton Boggs LLP

(57) ABSTRACT

A software product and method are disclosed for preventing and treating Repetitive Stress Injuries (RSIs) in computer users. The software product is comprised of an exercise program stored on a storage medium. The exercise program operates with a computer to display images demonstrating a random set of exercises on a computer screen in the following situations. The computer displays the images demonstrating the set of exercises when the computer user selects an icon on the computer screen, when a certain amount of time has passed since the set of exercises has last been displayed, and as a screen saver. The images demonstrating the set of exercises shows the computer user how to perform exercises that are geared to prevent and treat RSIs. The software includes a version that accommodates children, a version that accommodates adolescents, a version that accommodates teenagers, and a version that accommodates adults. Each version includes images that distinctly appeal to the respective age group. The time period between exercise sessions and the screen saver time period are different for the adult's and children's versions.

14 Claims, 3 Drawing Sheets

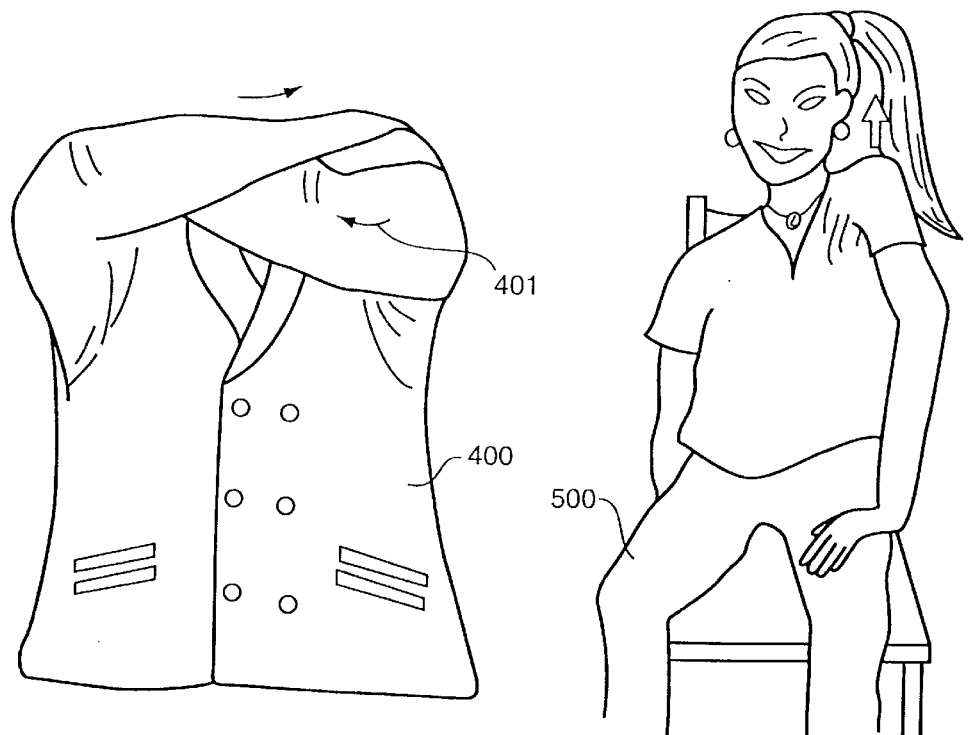
FIG. 4
FIG. 5
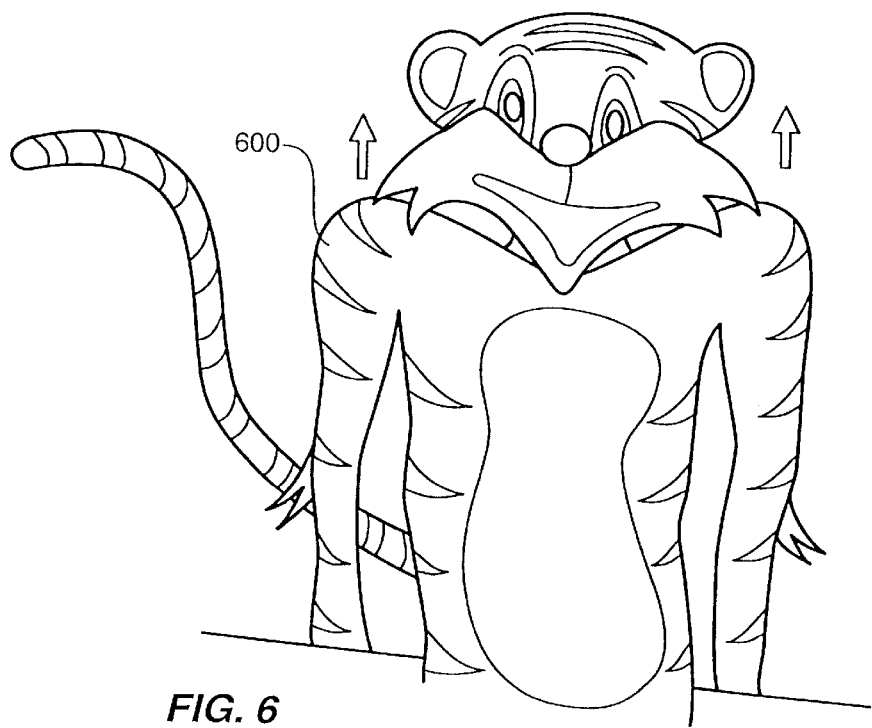
FIG. 6

SOFTWARE PRODUCT FOR PREVENTING AND TREATING REPETITIVE STRESS INJURIES

BACKGROUND OF THE INVENTION

1. Field of the Invention

The invention relates to the field of software products and, in particular, to an exercise program that demonstrates a set of exercises to a computer user that are geared towards preventing and treating Repetitive Stress Injuries (RSIs).

2. Description of the Prior Art

Various work, educational, and recreational activities involve using computers. Continued and sustained computer use can be a health risk to a computer user. The repetitive nature of typing on a keyboard and moving and clicking a mouse can cause injuries to the computer user. Such injuries are commonly referred to as Repetitive Stress Injuries (RSIs).

RSIs are injuries caused by repeated physical movements doing damage to tendons, nerves, muscles, and other soft body tissues. RSIs can be caused by a combination of factors such as repetitive tasks, awkward or fixed body positions, forceful movements, and insufficient rest. Some common symptoms of RSI are aching, tenderness, swelling, pain, crackling, tingling, numbness, or loss of strength in the injured area, which can eventually lead to loss of the use of the affected fingers, hand, arm, and/or shoulder. Other names for RSIs are Cumulative Trauma Disorders (CTDs), Repetitive Strain Injuries, Repetitive Motion Syndrome, Occupational Overuse Syndrome, tendinitis, tenosynovitis, ganglionic cysts, Carpal Tunnel Syndrome (CTS), De Quervian's Disease, Trigger Finger, Epicondylitis (tennis elbow), and Thoracic Outlet Syndrome.

RSIs develop slowly over time as opposed to single incident injuries such as sprains or strains. The RSIs should be identified early, because if allowed to progress, an RSI can result in permanent damage. If the computer user develops an RSI, the injury can be treated with physical therapy or surgery. However, an easy and effective way for a computer user to deal with RSIs is by preventing the development of the RSIs.

There are a number of devices and methods on the market to help the computer user prevent the development of and/or to treat RSIs. One such device includes touch pads mounted on a computer monitor and a keyboard in various positions. The computer user is instructed to reach for and touch the touch pads after prolonged typing which exercises the body to prevent RSIs. In one method of preventing RSIs, a computer displays a screen saver on a computer screen reminding the computer user to exercise. The screen saver also illustrates a set of exercises for the computer user to perform. In another method, a computer keeps track of the number of keystrokes and mouse functions the computer user performs, and prompts the user to take a break after a certain number of functions. The computer screen displays a set of exercises for the computer user to perform during the break.

A problem with the current devices and methods of preventing RSIs is they are not designed to accommodate different users having differing physical needs and who may interact differently with an RSI prevention system. For example, they are not designed to accommodate different age groups, particularly children. While the exercises recommended by physicians for preventing RSIs may vary depending on the age and gender of the computer user, and while the strategy that will encourage the computer user to participate in the exercises may vary depending on the age of the computer user, prior art software products designed to address RSIs have been available only in a version directed to adults.

Another problem is that prior art programs are primarily geared toward treatment of an already existing condition, and thus do not focus on prevention. A further problem is that the treatment and or prevention exercises are presented in a set manner, so that after considerable use they become tiresome and/or boring. A related problem is the high level of standardization and lack of customizable features and components. Such standardization tends to feel intrusive to users, and thus discourages use of the prior art programs.

All of the above problems present significant impediments to the successful use of an RSI prevention system. Since the programs are not designed to be interacted with over long periods, particularly by users not in dominant user groups, such users will stop using the programs, preventing them from being effective.

SUMMARY OF THE INVENTION

The invention solves the above problems by providing a software product useful in both preventing and treating Repetitive Stress Injuries in computer users. The software product has different versions for different users. Various options are programmed differently for different user groups. The exercise to be displayed is randomly selected from a large group of exercises. Thus, the software program overcomes the impediments to successful use of the programs in the prior art.

The software product is comprised of an exercise program stored on a storage medium. The exercise program is configured to display images on a computer screen demonstrating a set of exercises. The exercise program displays the images when a computer user selects an icon on the computer screen, when a first time period expires, or as a screen saver; that is, the computer displays the RSI images when the computer processor receives no input from a manual input device, e.g., a keyboard or mouse, for a second period of time, or when the computer screen remains uniform for the second time period. The first time period refers to a set time between exercise sessions wherein the computer reminds the computer user to take a break and perform the set of exercises.

In one embodiment of the invention, the exercise program has multiple versions designed for different age groups. A children's version is designed for computer users between the ages of 4 years to 7 years. An adolescent's version is designed for computer users between the ages of 8 years to 12 years. A teenager's version is designed for computer users between the ages of 13 years to 18 years. An adult's version is designed for computer users 19 years and above. The sets of exercises and the images displayed on the computer screen differ between the versions. The first and second time periods are also different for the different versions. For example, the second time period for the 4 years to 7 years version is much shorter than the second time period for the 19 years and above version.

In another embodiment of the invention, the program includes a plurality of exercise images and a random selection generator. The image to be presented is randomly selected from the plurality of images. In a related embodiment, there are a plurality of exercise image groups. The group to be presented is randomly selected from the plurality of image groups.

BRIEF DESCRIPTION OF THE DRAWINGS

FIG. 4 depicts an image displayed on a computer screen in an example of an adult's version of the invention;

FIG. 5 depicts an image displayed on a computer screen in an example of teenager's version of the invention; and FIG. 6 depicts an image displayed on a computer screen in an example of a children's version of the invention.

DETAILED DESCRIPTION OF THE PREFERRED EMBODIMENT

Figure 1:
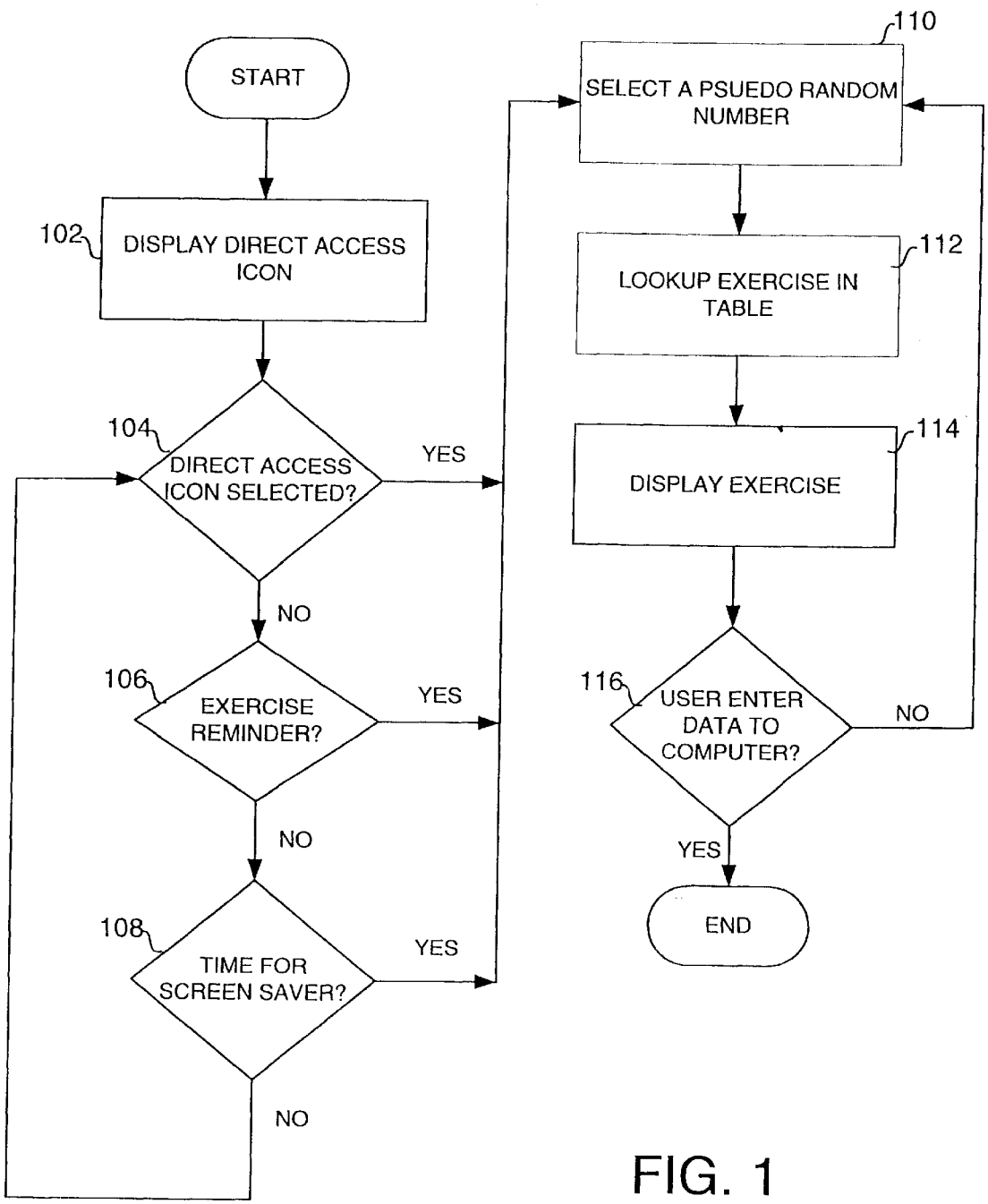
FIG. 1 is a flow chart depicting the operation of a software product in an example of the invention.

FIG. 1 shows a flowchart depicting an operation of a software product in accordance with the present invention. Those skilled in the art will appreciate numerous variations from this example that do not depart from the scope of the invention. Those skilled in the art will also appreciate that various elements could be combined to form multiple variations of the invention.

The software product is comprised of an exercise program stored on a storage medium. The storage medium can be a floppy disk, a Compact Disk (CD), a computer memory such as a chip or hard disk, a tape, or any other storage medium. The exercise program is executed by a computer processor and is configured to display one or more images on a computer screen. There are a plurality of images, preferably forty or more, and most preferably, more than one hundred. Preferably, the images are divided into groups with each group demonstrating an exercise. Preferably, there are sets of groups, with each set demonstrating a set of exercises. The sets of exercises are geared towards preventing and treating Repetitive Stress Injuries (RSIs) in computer users.

Preferably, the exercise to be presented, as well as the groups to be presented, are selected randomly. A number is associated with each exercise in a look-up table.

A pseudo-random number generator generates a number in step 110, which is associated with an exercise by use of the table in step 112, and then the exercise selected is displayed in step 114. Sets of exercises may also be associated with a number, and when the number corresponding to the set is selected, the set is displayed in a predetermined order.

The exercise program has multiple versions to accommodate different age groups. A children's version is designed for computer users between the ages of 4 years to 7 years. An adolescent's version is designed for computer users between the ages of 8 years to 12 years. A teenager's version is designed for computer users between the ages of 13 years to 18 years. An adult's version is designed for computer users 19 years and above. The number of sets of exercises and the time to complete a set of exercises varies between the versions. As the age increases from the children's version to the adult's version, so does the number of sets of exercises. The images displayed on the computer screen also vary depending on the version, as shown in FIGS. 4–6. In these figures, arrows, such as arrow 401 in FIG. 4, are included to illustrate movement. That is, in the program, the images that illustrate the exercises move in a manner such as to demonstrate an exercise.

As an example, as shown in FIG. 4, the adult version utilizes a clothing article, such as a jacket 400, to illustrate the exercise. The jacket 400 is shown performing an exercise that works, limbers and relaxes the arm and back muscles and ligaments. An article of clothing is selected rather than, say a person, because it adds a measure of unconventionality that draws attention. As another example, in FIG. 5, the teenage version utilizes a teenage female FIG. 500 to illustrate the exercise. The female FIG. 500 is performing an exercise that works, limbers, and relaxes the wrist, arm, and shoulder muscles and ligaments on one side of the body. A teenage figure is selected because teenagers are highly influenced by peers and find what peers do as interesting. As a third example, the children's version utilizes an attractive animal FIG. 600 to illustrate the exercise, as shown in FIG. 6. The animal FIG. 600 is shown performing an exercise that works, limbers and relaxes the muscles and ligaments of both shoulders and the neck. An attractive animal figure is selected because children find such figures interesting.

The program according to the invention preferably runs in the background of the computer while the computer runs different applications. The computer stops running the different applications and displays images demonstrating a set of exercises on the computer screen in the following situations referred to as a direct access icon, a break reminder, and a screen saver, respectively.

First, as discussed above, the computer displays the images demonstrating the set of exercises 114 if the computer user selects an icon 104. The exercise program preferably displays the direct access icon on the computer screen at all times. Icons are well known in the art as images displayed on the computer screen for selection by the computer user. The computer user selects the direct access icon by moving a pointer on the computer screen to the direct access icon and selecting the direct access icon.

Second, the computer displays the images demonstrating the set of exercises 114 as an exercise reminder 106. The computer reminds the computer user periodically through the day to take a break by displaying an unobtrusive reminder image on the computer screen. For children, the reminder image is both fun and engaging, to encourage use of the program. The computer user clicks on the reminder image to begin displaying the images demonstrating the random sets of exercises. In an alternative embodiment, the computer does not display the reminder image, but displays the images demonstrating the set of exercises.

Third, the computer displays the images demonstrating the random set of exercises 114 as a screen saver 108. Screen savers are well known in the art. Screen savers run if the computer user does not enter input into the processor for a predetermined time period. In the preferred embodiment, the screen saver runs when there has not been input to the computer from any manual input device for the predetermined time period. In an alternative embodiment, the screen saver runs after the computer screen has not substantially changed, or remains substantially uniform for the predetermined time period. The computer screen remaining substantially uniform means that there is not a substantial change in the image on the computer screen.

In one of the above situations, the computer displays the images on the computer screen demonstrating the set of exercises 114. The images instruct the computer user how to perform the set of exercises by illustrating the physical body movements. The exercise program includes one or more sets of exercises. The computer randomly selects the sets of exercises. The amount of time to complete the set of exercises is randomly selected by the computer and typically ranges from 10 seconds to 30 seconds. When the computer finishes displaying the images demonstrating the set of exercises, the computer randomly selects a second set of exercises via steps 110 and 112, and displays images demonstrating the second set of exercises 114. The computer continues to display images demonstrating sets of exercises until the computer user manually enters data to the computer 116, such as hitting any key on the keyboard or clicking a mouse button.

Figure 2:
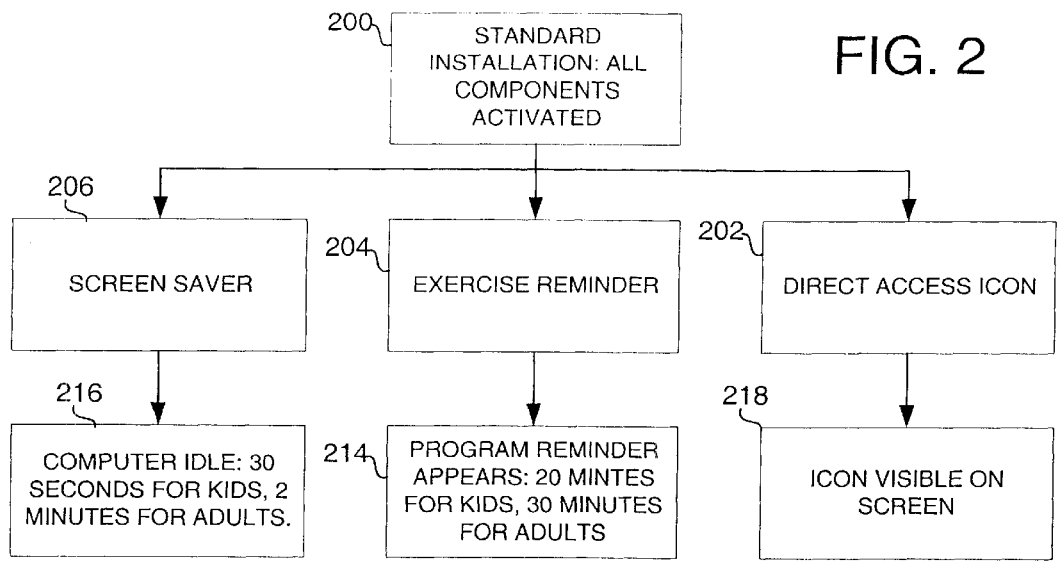
FIG. 2 is a block diagram showing the components and steps of a standard installation of an exercise program in an example of the invention.

The exercise program can be installed as a standard installation or a custom installation. Referring to FIG. 2, the direct access icon 202, the break reminder 204, and the screen saver 206 are all installed in the standard installation 200. Program parameters are pre-set in the standard installation. For instance, the exercise reminder is pre-set in step 214 at 30 minutes in the adult's version and 20 minutes in the other versions. In step 216, the screen saver is pre-set at 2 minutes in the adult's version and 30 seconds in the other versions. The direct access icon is automatically displayed in step 218 in the standard installation. The computer user may change the parameters after installation.

Figure 3:
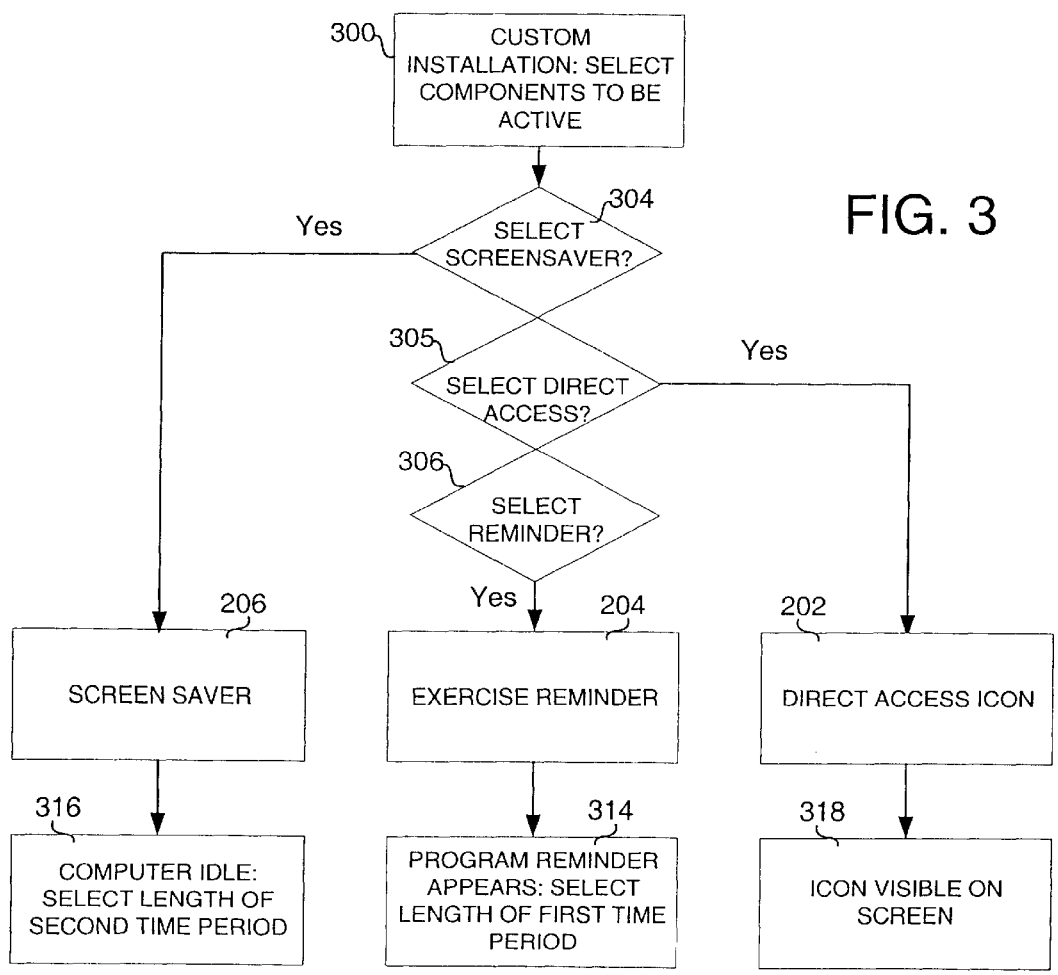
FIG. 3 is a block diagram showing the components and steps of a custom installation of an exercise program in an example of the invention.

Referring to FIG. 3, in the custom installation 300, in steps 304, 305, and 306, the computer user chooses whether to install the screen saver 206, the direct access icon 202, or the exercise reminder 204, respectively, or any combination thereof. The computer user sets the program parameters to meet his or her needs. For instance, the computer user may choose in a step 318 whether or not to display the direct access icon. The computer user sets the time frame for the exercise reminder in step 314. The computer user also sets the time frame for the screen saver in step 316. The computer user sets the parameters for each version that is being installed. The computer user may change the parameters after installation.

The exercise program is specially designed to both prevent and treat RSIs in computer users. For treatment, computer users that are already diagnosed with an RSI can click on the direct access icon any time they feel pain or discomfort or wait for the exercise reminder. Exercise has been shown to relieve pain associated with RSIs and actually reverse the effects of RSIs without surgery. For prevention, computer users that have not been diagnosed with an RSI can perform exercises when the exercise reminder appears or when the screen saver appears. Computer users may develop discipline in exercising, and click on the direct access icon when they want to exercise. Periodic exercise throughout the day has been shown to prevent RSIs from developing.

The above-described exercise program can be comprised of instructions that are stored on storage media. The instructions can be retrieved and executed by a processor. Some examples of instructions are software, program code, and firmware. Some examples of storage media are memory devices, tape, disks, integrated circuits, and servers. As the art progresses, new forms of such storage media will be devised. The instructions are operational when executed by the processor to direct the processor to operate in accordance with the invention. Those skilled in the art are familiar with instructions, processors, and storage media.

Returning to the example of an image displayed by the exercise program on a computer screen for the adult's version as shown in FIG. 4, the image is comprised of an article of clothing, such as a left-handed glove, a right-handed glove, a coat, and a hat. The image is animated and performs a set of exercises. The image demonstrates the physical movements that the computer user is to mimic. The type, color, and style of the gloves, the coat, and the hat change as the set of exercises is displayed. In the adult version, the image is presented directly and the user is encouraged to copy the activity.

FIG. 5 shows an example of an image displayed by the exercise program on a computer screen for the teenager's version. The image is designed to represent a teenager's peer. The peer character demonstrates the set of exercises to the computer user. Participation is encouraged by suitable use of sound, such as words and music, or by displaying words on the screen. The appearance and movement of the figure is particularly design ed to reflect contemporary teenage dress and behavior, and the words and music are designed to utilize the peer influence, such as reminding the teenager that the exercises will prevent them from developing physical problems that could interfere with their peer interaction. The adolescent's version displays an animated cartoon human character, and is designed to appeal to adolescents.

FIG. 6 shows an example of an image displayed by the exercise program on a computer screen for the children's version. The image is an animated animal character. The animal character demonstrates the set of exercises to the computer user. The animal character also encourages participation by the computer user using sound, such as words or music. The set of exercises is presented in a manner to appeal to young computer users as a game. For example, a talking character appears on the screen and says, "Let's play", or "See if you can do this", followed by the demonstration of an exercise. In one embodiment, the game is structured in accordance with the familiar child game, Simon Says.

The children's, the adolescent's, and the teenager's versions are important to maintain the health of young people. Today's children use and rely on computers much more heavily than previous generations. Since computer use begins early, the onset of RSI can and often does begin at an earlier age. A recent Cornell University study of children and computer use states that as children spend more time on computers, their developing musculoskeletal structures could be especially vulnerable to trauma, It is also stated that at present rates, today's children will spend more than two years during their lifetimes on e-mail and more then 23 years on the Internet. Consequently, children must be aware of the health risks associated with computer use, because RSIs can occur even in young, physically fit individuals. RSI prevention and treatment programs that are made for adults are unlikely to motivate children to exercise. Teaching good habits for exercise can last a lifetime.

The software product described above provides an effective method for both preventing and treating RSIs. The exercise program displays animated images to keep the computer user's attention. The computer randomly selects the set of exercises displayed so that the exercise routines do not get routine and boring. The exercise program includes multiple versions designed for different age groups. The teenager's, the adolescent's, and the children's versions are specifically advantageous for preventing RSIs in young people. Animated images encourage the young people to perform the set of exercises and develop good computing habits.

Those skilled in the art will appreciate variations of the above-described embodiments that fall within the scope of the invention. As a result, the invention is not limited to the specific examples and illustrations discussed above, but only by the following claims and their equivalents.

We claim:

1. A software product for preventing and treating Repetitive Stress Injuries in a computer user, comprising:

an exercise program configured when executed by a processor to: display an image on a computer screen responsive to a command of the computer user; display said image on the computer screen responsive to a first time period expiring, and display said image on the computer screen responsive to an event selected from the group consisting of: the computer screen remaining uniform for a second time period and said processor receiving no manual input for said second time period;

a software storage medium configured to store said exercise program; and wherein said image displayed on the computer screen demonstrates a physical exercise.

2. The software product in claim 1 wherein said exercise program is further configured to display an icon on the computer screen and said command of the computer user comprises the selection of said icon by the computer user.

3. The software product in claim 1 wherein said exercise program is further configured to stop running if the computer user manually inputs data to the processor.

4. The software product in claim 1 wherein said program is configured to display on said computer screen a plurality of images representing a plurality of exercises.

5. The software product in claim 4 wherein said exercise program is further configured to randomly select said exercise from the plurality of exercises.

6. The software product in claim 1 wherein said exercise program is further configured to prompt the computer user to change said first time period.

7. The software product in claim 1 wherein said exercise program is further configured to prompt the computer user to change said second time period.

8. The software product in claim 1 wherein said exercise program is further configured to generate sounds.

9. The software product in claim 1 further comprising a plurality of different exercise programs wherein each of said plurality of different exercise programs is designed for computer users of different age groups.

10. The software product in claim 9 wherein said plurality of exercise programs include a children's version wherein said children's version is designed for computer users between the ages of approximately 4 years to 7 years.

11. The software product in claim 9 wherein said plurality of exercise programs include an adolescent's version wherein said adolescent's version is designed for computer users between the ages of approximately 8 years to 12 years.

12. The software product in claim 9 wherein said plurality of exercise programs include a teenager's version wherein said teenager's version is designed for computer users between the ages of approximately 13 years to 18 years.

13. The software product in claim 9 wherein said plurality of exercise programs include an adult's version wherein said adult's version is designed for computer users approximately 19 years of age and above.

14. The software product in claim 1 further comprising a plurality of different said images wherein each of said plurality of different images is randomly selected.

* * * * *